G. W. CONRADE.
PAN-LIFTER.

No. 172,848.  Patented Feb. 1, 1876.

WITNESS'S.
Q. M. R. Miller.
Thomas Byrne.

INVENTOR.
G. W. Conrade.
Per H. S. Abbot.
Attorney.

United States Patent Office.

GEORGE W. CONRADE, OF CIRCLEVILLE, OHIO.

IMPROVEMENT IN PAN-LIFTERS.

Specification forming part of Letters Patent No. 172,848, dated February 1, 1876; application filed September 9, 1875.

*To all whom it may concern:*

Be it known that I, GEORGE W. CONRADE, of Circleville, county of Pickaway and State of Ohio, have invented certain new and useful Improvements in Pan-Lifters for Stoves, of which the following is a specification:

The nature of my invention consists in the construction and arrangement of a pan-lifter for stoves, as will be hereinafter more fully set forth.

In order to enable others skilled in the art to which my invention appertains to make and use the same, I will now proceed to describe its construction and operation, referring to the annexed drawing, which forms a part of this specification, and in which—

Figure 1:
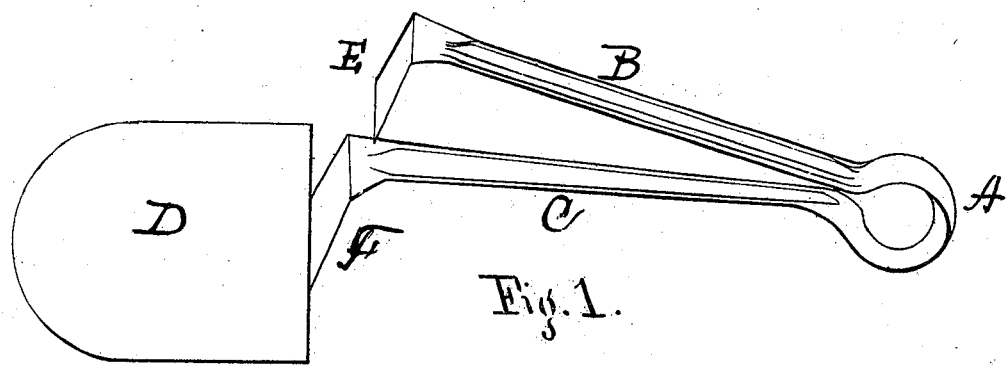
Figure 2:
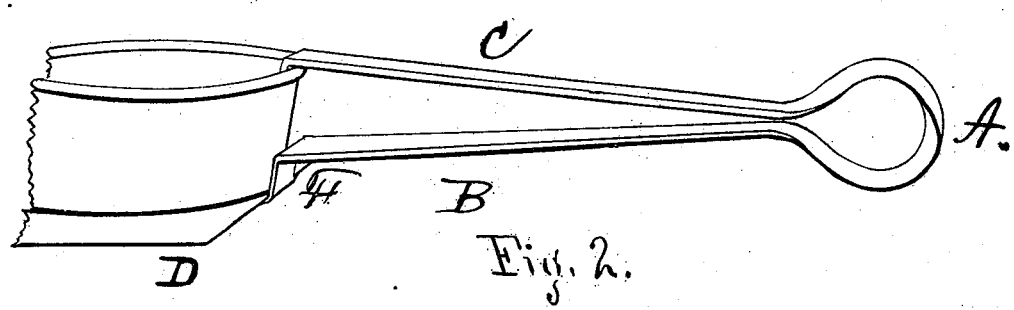

Figure 1 is a perspective view of my invention, and Fig. 2 is a side elevation.

The handle of my pan-lifter is, preferably, made of steel, bent at or near the center to form the circle A and two arms, B C. These arms are made concavo-convex, so as to have the requisite strength, and yet be light and easy to handle.

The outer end of the arm B is bent downward at an obtuse angle, forming the lip F, and to the same is fastened the blade D, extending on a line parallel with the arm. The outer end of the arm C is also bent downward at about right angles, forming the lip E.

The blade D is passed under the pan to be lifted, and the handle then pressed together, so that the lip E comes over the rim of the pan, pressing it firmly against the lip F, when the pan is held firmly and can be moved to any place desired. By simply releasing the pressure on the handle it springs open, so as to remove it from the pan.

The handle may be made of iron instead of steel, in the same general shape, and then a coiled or other spring will be inserted between the two arms thereof.

Having thus fully described my invention, what I claim as new, and desire to secure by Letters Patent, is—

The within-described pan-lifter, consisting of the spring-handle made in one piece to form the circular bend A, arms B C, and lips E and F, the lip E being given such an inclination as will cause it to impinge against the lip F in its downward movement, and thereby to hold a pan rigidly between said lips, substantially as shown and described.

In testimony that I claim the foregoing as my invention I hereunto affix my signature.

GEORGE W. CONRADE.

Witnesses:
   H. B. BROWN,
   THOMAS BYRNE.